Figure 1:
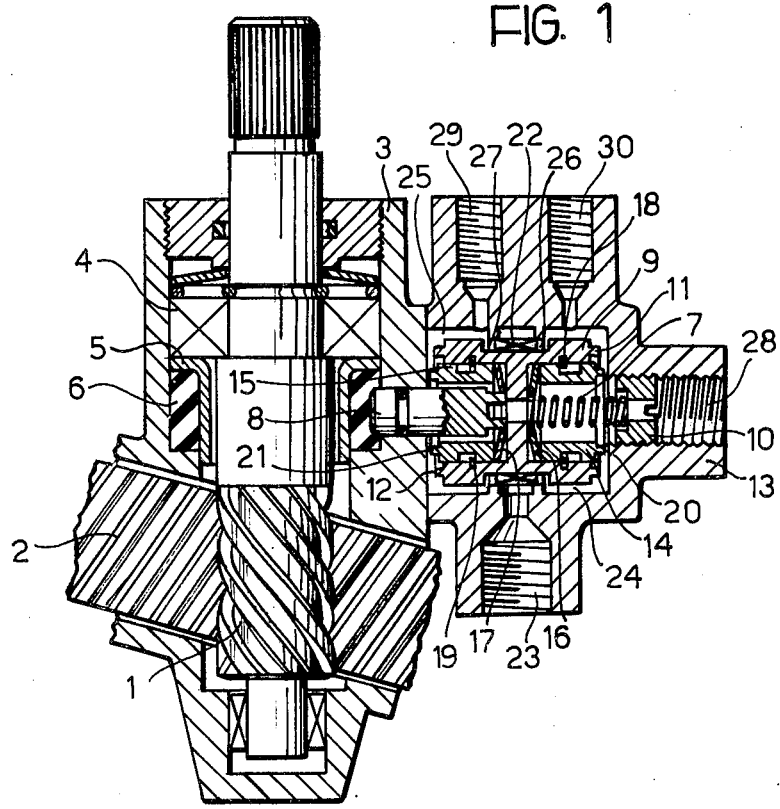

United States Patent [19]

Cordiano

[11] Patent Number: 4,487,281
[45] Date of Patent: Dec. 11, 1984

[54] POWER-ASSISTED RACK-AND-PINION STEERING MECHANISM

[75] Inventor: Ettore Cordiano, Turin, Italy
[73] Assignee: Corint S.r.l., Turin, Italy
[21] Appl. No.: 438,554
[22] Filed: Nov. 2, 1982

[30] Foreign Application Priority Data

Nov. 9, 1981 [IT] Italy ............................ 68448 A/81

[51] Int. Cl.³ .................... B62D 3/12; B62D 5/08; F15B 9/10
[52] U.S. Cl. .................................. 180/148; 74/498; 91/467; 92/136
[58] Field of Search ................... 180/148, 132, 147; 74/498, 388 PS; 91/467; 92/136

[56] References Cited

U.S. PATENT DOCUMENTS

| | | | |
|---|---|---|---|
| 4,299,302 | 11/1981 | Nishikawa et al. | 180/148 |
| 4,351,228 | 9/1982 | Schultz et al. | 180/148 |
| 4,361,076 | 11/1982 | Gluck | 180/148 |
| 4,401,180 | 10/1983 | Nishikawa et al. | 180/148 |

Primary Examiner—Joseph F. Peters, Jr.
Assistant Examiner—Donn McGiehan
Attorney, Agent, or Firm—Sughrue, Mion, Zinn, Macpeak & Seas

[57] ABSTRACT

Power-assisted rack-and-pinion steering mechanism with a slide-valve which senses the axial thrusts acting on the pinion through a kinematic mechanism with a high transmission ratio, the slide member of the valve consisting of a piston 9 provided with frontal rims 11 and 12 on each end face, cooperating with associated seats formed on the housing, said rims and seats forming varying passages through which the two actuator chambers are connected to the reservoir, means being provided for varying also the communication between the same chambers and the pump, depending on the torque applied to the pinion, piston, seats and housing being so designed that the fluid pressure existing in the operative chamber acts on one or the other piston end face and thus gives the driver the measure of the same pressure.

The system is particularly suitable for a vacuum operated power-steering system which permits a very strong reduction in cost in comparison with a conventional hydraulic power-steering system.

9 Claims, 9 Drawing Figures

POWER-ASSISTED RACK-AND-PINION STEERING MECHANISM

The present invention relates to a power-assisted rack-and-pinion steering mechanism for motorvehicles of the kind comprising:
- A rack,
- A helical-tooth pinion,
- A two-chamber actuator assisting the rack in its axial displacement,
- A valve which, depending on the torque applied to the pinion, adjusts the pressure head between the two chambers of the actuator,
- A reservoir of fluid and
- A pump driven by the vehicle engine and producing the pressure head in the actuator chambers, the valve being of the slide-valve kind, with the slide member moving in translation along an axis different from that of the pinion, to which pinion it is connected by means of a mechanism with a high transmission ratio, preferably of the type claimed by the Italian Pat. No. 68449 A81.

It is known that two different kinds of power-steering systems exist: the "open centre" system in which oil is continously circulating in the circuit comprising pump, valve, actuator, reservoir, and the valve works by cutting off the connection of the inoperative chamber to the pump, simultaneously throttling the communication of the operative chamber with the reservoir, thus causing the pressure in the latter to increase; and the "closed centre" system where oil circulates in the hydraulic circuit only when the servo-assistance is required and, therefore, only the amount of oil is used which is necessary for each steering operation.

It is also known that "reactivity" is a desirable feature for whatever kind of power-steering system, i.e. the capability to make the driver feel the force applied by the actuator to the wheels, through the reactions on the steering-wheel.

Finally, it is convenient that the diagram power-assistance effect versus torque on steering-wheel has the shape indicated in FIG. 2, i.e. below a certain value of the torque the pressure increases at a low rate, whereas above this value, practically in the parking manoeuvres, pressure rises much more rapidly.

Excepting rare, special cases, the rack-and-pinion power-steering systems commonly used at present are of the open centre kind. They have normally the disadvantages of being rather expensive, lacking of reactivity, with bulky valves which create serious problems for their installation on certain vehicles.

It is object of this invention to eliminate these weak points of the present solutions by realizing a power-assisted rack-and-pinion steering mechanism with a valve which is simpler, more economic and less bulky than the present known valves, provided with reactivity characteristics and which permits the use of sources of active fluid much cheaper than those commonly used.

This object is reached according to the invention in that the slide member of the valve consists of a piston provided with a rim on each end face, each rim cooperating with an associated seat formed on the valve housing or on members born by the housing, said rims and seats forming passages through which the two actuator chambers are connected to the source of low pressure fluid, said passages varying as a result of the piston axial displacements, means being provided through which also the communication between the same chambers and the source of the higher pressure fluid is varied depending on the piston displacements, piston and seats being so designed that the fluid pressure in the operative chamber acts upon the surface of the piston included between its outer diameter and the effectice diameter of sealing between rim and associated seat, and thus gives on the piston a thrust which is a linear function of the force transmitted by the pinion to the piston through the transmission mechanism, with the result that the pressure in the operative chamber is a linear function of the torque applied by the driver to the steering-wheel.

According to further developments of the invention, a closed centre system can be adopted for the power-steering mechanism and air can be used for its operation, compressed or expanded by a vacuum pump, with a further significant improvement in the cost of the system.

The advantages of the invention consist in particular of:
- reduced costs as a result of a greater simplicity of the various components and larger machining tolerances permitted by the large displacements of the valve slide member,
- reduced and more adaptable bulk because the parts added to the steering gear can be located in the most convenient position with respect to the adjacent car components,
- facility of calibration of the pressure variation rate only by operating on the diameters of piston, rims and valves,
- reactivity characteristics,
- better directional feeling because the high transmission ratio between pinion and piston permits small elastic rotations of the pinion for attaining the full power-assistance,
- possibility of using air, and in particular vacuum, with a consequent dramatic costs reduction for all components of the system, i.e. pump, valve, actuator and connection pipes. The use of vacuum is particularly advantageous on Diesel vehicles, where the vacuum pump is already required for the servo-brake operation.

Figure 3:
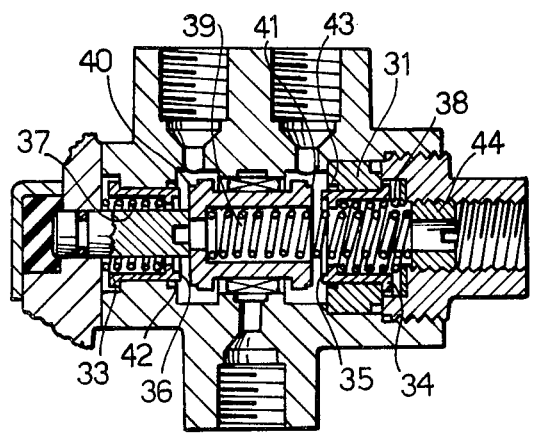
Figure 2:
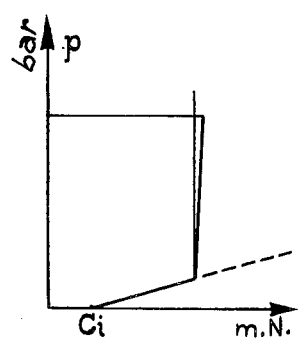
Figure 5:
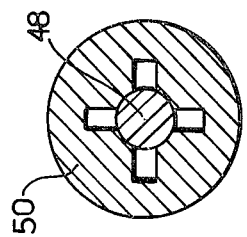
Figure 4:
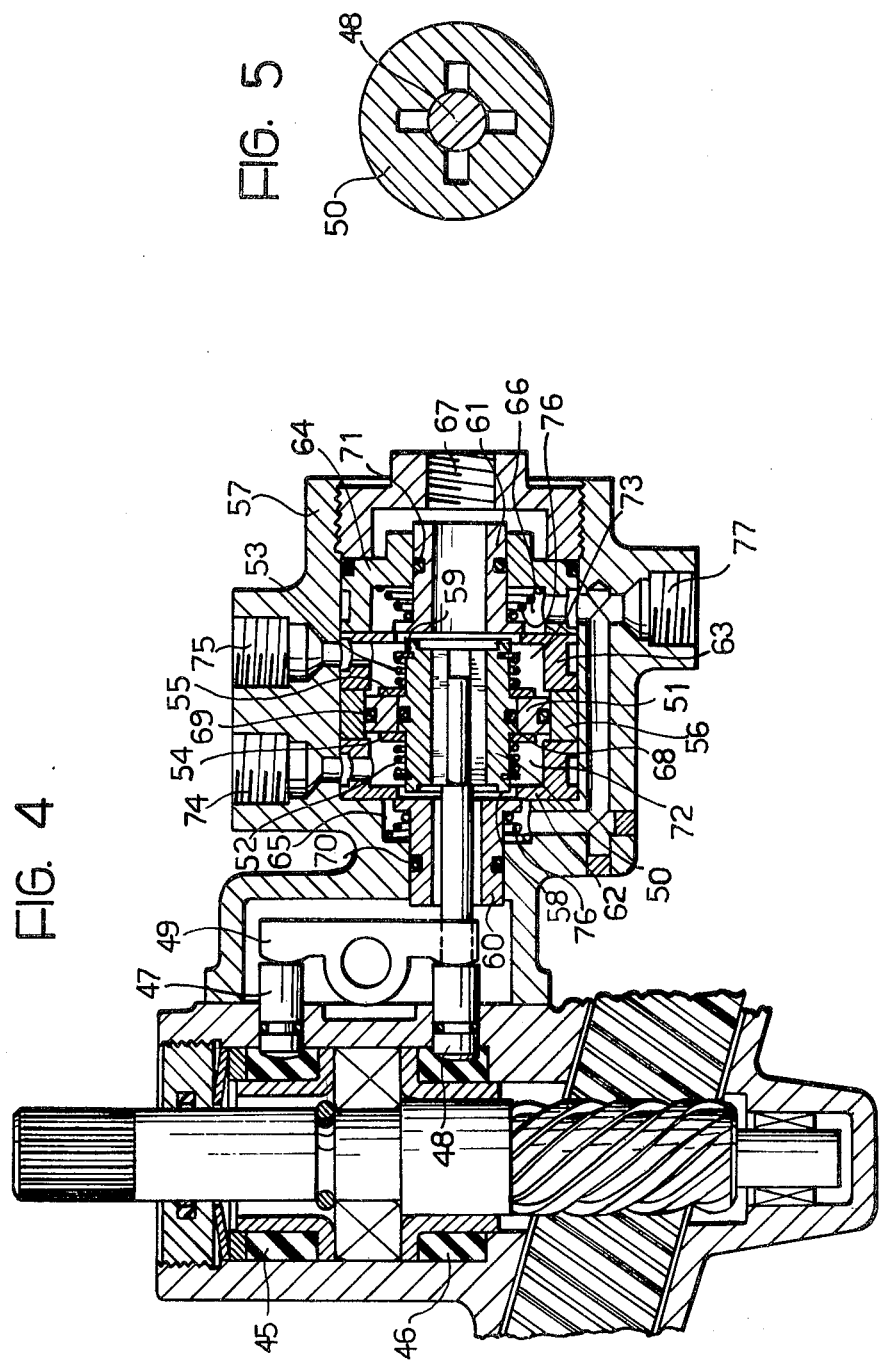
Figure 6:
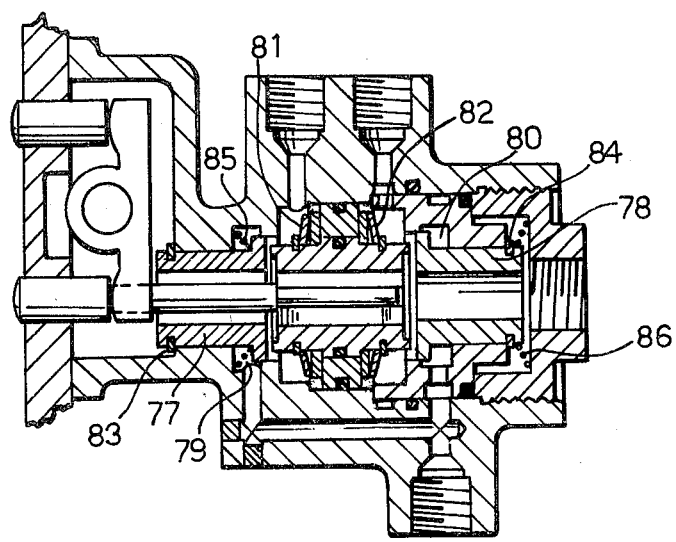
Figure 7:
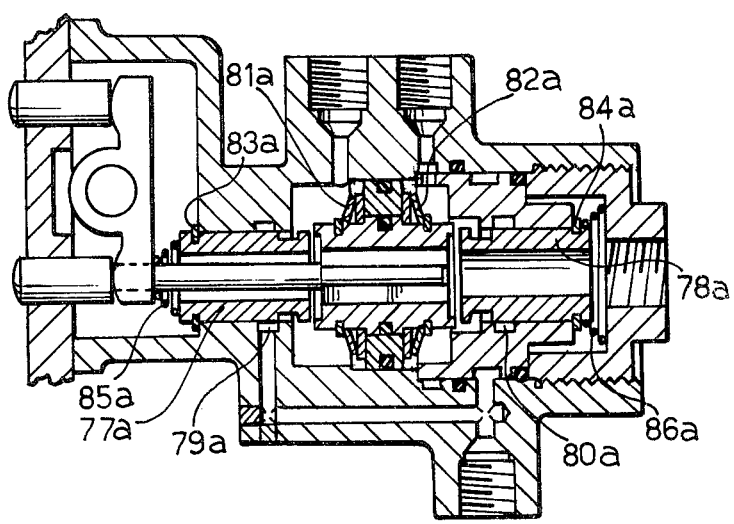
Figure 8:
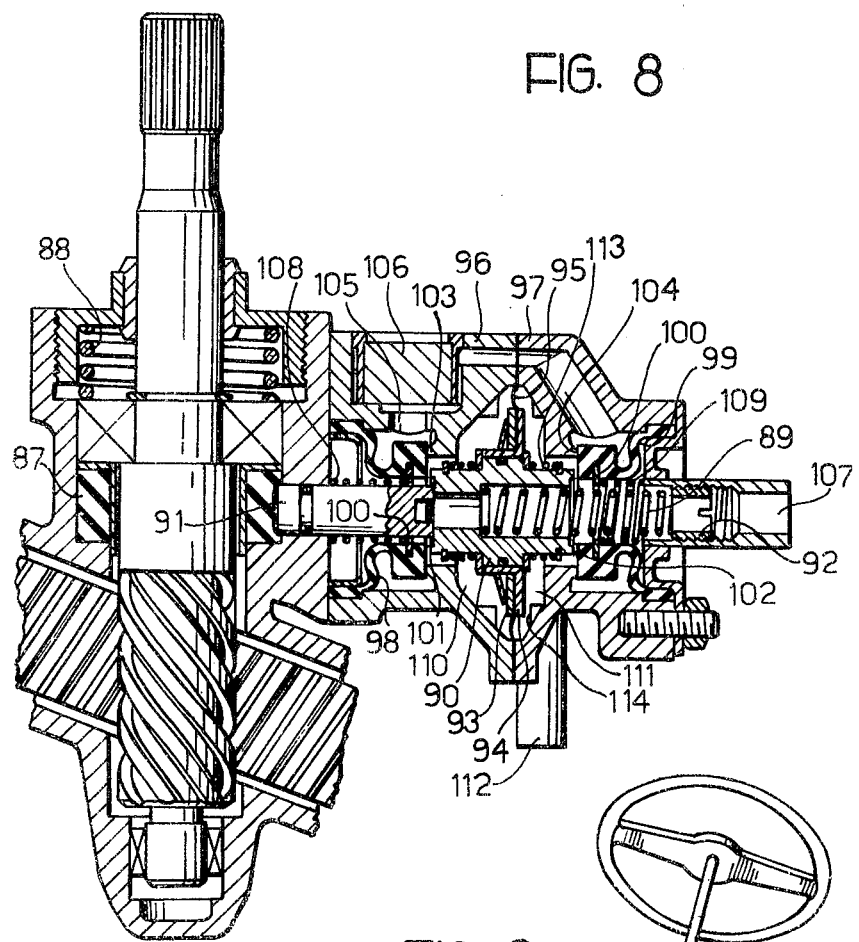
Figure 9:
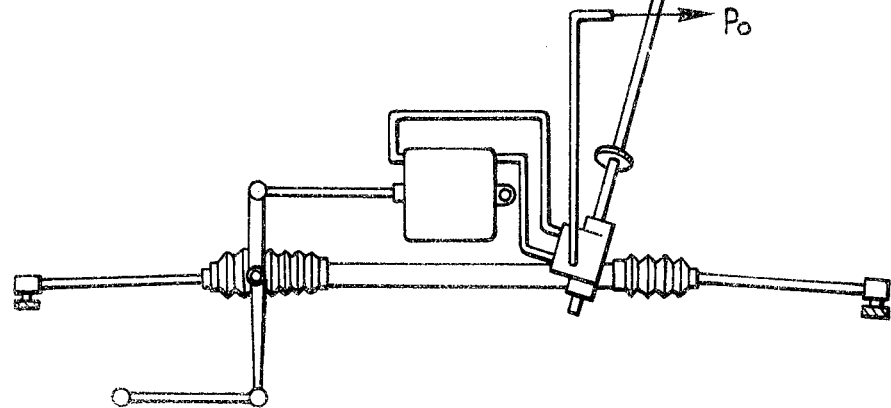

The invention will now be described, by way of non-limitative example with reference to the accompanying drawings, in which:

FIGS. 1 and 3 show two different embodiments of a valve for an open centre steering system, FIG. 2 is a diagram of pressure versus torque, FIGS. 4, 6, 7 are three different embodiments of a valve for a closed centre system and with a kind of transmission mechanism different from FIG. 1, FIG. 5 is a cross-section of the piston of FIG. 4, FIG. 8 is a valve suitable for vacuum devices, FIG. 9 is a general diagram of an installation comprising a transmission member between actuator and rack.

The valve of FIG. 1, relating to an open centre arrangement, is disposed on an axis substantially at right angle to the pinion and its sliding member is connected to the pinion by a kinematic mechanism which steps up motion and is claimed by the Italian Pat. No. 68449 A/81.

Helical pinion 1, axially pushed by rack 2, via bearing 4 and member 5 transmits the thrust to rubber ring 6. This urges against push-rod 8 and moves it together with piston 9. Spring 7 presses the piston against the push-rod and this against the rubber ring, and is adjusted by sleeve 10 in such a way as to locate the piston in its centre position with zero torque. The end faces of piston 9 bear two annular rims 11, 12 which, when the piston moves right- or leftwards, are pressed against the end wall of casing 13 or against the closing surface on the steering-gear housing 3 respectively. Two hollow cylinders 14, 15 are lodged inside and at the ends of the piston and can move relative to the piston; they are normally pressed by springs 16, 17 against the stop rings 18, 19. The cylinders likewise have two front rims 20, 21 which abut in sealing-tight manner against the same surfaces as rims 11, 12 of the piston. The front rims of the cylinders project slightly more than piston rims 11, 12.

In its middle part the piston has a toothed portion 22 for guiding it in casing 13 and enabling fluid to flow from inlet duct 23 to stationary grooves 24, 25 of the casing, via piston grooves 26, 27. Duct 23 leads to the pump. From groove 25 fluid flows to duct 29 leading to a chamber of the actuator or to outlet duct 28, via the gaps between 12, 21 and the closure surface on housing 3 and via the internal passages inside the piston and hollow cylinders 14, 15. From grooves 24 fluid flows to duct 30 leading to the other actuator chamber or to the outlet duct 28 via the gaps between rims 11, 20 and the end wall of casing 13. Duct 28 leads to the reservoir.

The device operates as follows. In the rest position, with zero torque, the clearance between rims 20, 21 and the respective facing surfaces is greater than the corresponding edges of stationary grooves 24, 25 and moving 26, 27 and thus the fluid flows freely from duct 23 to outlet 28. When an increasing torque is applied to the pinion, thus moving the piston, e.g. to the right, there is a first period during which the passage between grooves 25 and 27 is closed. In this moment the actuator chamber corresponding to duct 29 is only connected to the outlet, whereas all the incoming fluid flows towards the outlet via groove 26 and the gap between front rim 20 of cylinder 14 and the end wall surface of casing 13. When the piston moves further to the right, this gap is throttled so the pressure begins to increase upstream of rim 20 and consequently in the actuator chamber connected to duct 30.

This pressure acts on the surface of the piston included between rim 20 and the outer diameter of groove 27 and thus subjects the piston to a thrust which must be balanced by the force applied to push-rod 8 by the rubber ring as a result of the torque on the piston. The result is a linear relation between torque and pressure, until the load on cylinder 14, resulting from the pressure and the reaction of the end wall of casing 13 against rim 20, is less than the pre-stress of spring 16. Under these conditions piston 9 and cylinder 14 behave like a rigid assembly. When the pressure increases and the pre-stress of the spring is overcome, cylinder 14 moves back in the piston until rim 11 is directly in contact with the end wall surface. From this point onwards, further increases in pressure produce only slight increase in the thrust on the piston since the exposed area, i.e. that included between rim 11 and and the outer diameter of groove 27, is very limited and, consequently, slight increases in the force transmitted to the piston by the push-rod 8 are sufficient to raise the pressure in the operating chamber to the maximum value given by the pump.

In other words, cylinders 14, 15 with their springs 16, 17 act as torque limiting devices; they prevent torque to increase above a predetermined level. The shape of pressure/torque curve is of the kind shown in FIG. 2, where the dotted line indicates the values of pressure in case cylinders 14, 15 were not there and rims 20, 21 were formed directly on piston 9.

The valve of FIG. 1 can be modified by substituting both or only one of frontal seals between rims 11, 12 or 20, 21 and the cooperating stationary surfaces, with seals between suitable cylindrical cooperating surfaces on piston 9, cylinders 14, 15 and end walls of valve casing. It can be also modified by lodging cylinders 14, 15 on the casing instead of the piston. FIG. 3 shows one of the possible solutions of this kind, in which the frontal seal between cylindrical piston rims 11, 12 and the cooperating surfaces on the casing and its closure wall of FIG. 1 has been replaced by a cylindrical seal between cylindrical piston ends and cylindrical seats formed on the valve casing and its closure member 31. In addition, the limiting torque cylinders 33, 34 have been lodged in cavities formed in the same casing and closure member 31. As in FIG. 1, spring 39 is adjusted by sleeve 44 so as to locate the piston in its centre position with zero torque.

The valve operates in the same manner as that of FIG. 1: rims 35, 36 of cylinders 33, 34, in cooperation with the end faces of the piston, begin to throttle the fluid flow and, when the pressure in the operative chamber gives a thrust on cylinders 33 or 34 exceeding the force of springs 37 or 38, the cylinders re-enter their cavity. At this point the piston moves further and, when its edges 40 or 41 come into contact with edges 42 or 43 of the stationary seats, the pressure increases rapidly. The curve of variation of the pressure versus torque is identical with that of FIG. 2.

Both for the valves of FIGS. 1 and 3 it is easy to fix and optimize the parameters of this curve depending on the application, by varying the spiral angle of the pinion teeth, the dimensions of rubber ring and push-rod, the diameters of the piston, its rims and of the annular valves, and the characteristics of the springs.

FIGS. 4, 6, 7, 8 relate to a closed centre steering system in which the valve is inserted in a circuit comprising actuator, pump and two sources of fluid at different pressures, i.e. a high pressure $p_1$ and a lower $p_o$. At least one of these sources is a reservoir fed by the pump.

FIG. 4 shows a valve in which the linkage between pinion and piston is made up of two rubber rings 45, 46, two push-rods 47, 48 and a rocker 49, according to the solution claimed by the aforementioned Italian Pat. No. 68449 A/81.

When the rings are pressed in one or the other direction by the pinion bearing, they move the push-rods, the rocker and the slide member of the valve.

The sliding member comprises a piston 50 and a rim 51 which can move relative to the piston and is secured thereto by pre-stressed springs 52, 53 and whashers 54, 55. Rim 51 moves in a cylindrical seat formed in a bush 56 secured to body 57. The two end faces of piston 50 have two front rims 58, 59. An annular valve 60 is disposed adjacent rim 58 and coaxial with piston 50; it can move in a seat formed in body 57 and has a flange whose surface forms a front abutment against rim 58 and against a seat formed on sleeve 62. A second annular valve 61 identical with 60 is disposed adjacent rim 59 and slides in a seat born by sleeve 64 and its flange abuts rim 59 and against the front seat of a sleeve 63 identical with 62.

Fluid at pressure $p_1$ arrives at chambers 65, 66 from duct 77. The inner passages of valves 60, 61 and piston are connected to duct 67 which is connected to the source at lower pressure $p_o$. Rubber ring 68, 69, 70, 71 seal the various moving surfaces.

Springs 52, 53 are mounted with a pre-stress which is normally exerted on a suitable projection on piston 50 via whashers 54, 55. The pre-stress is fixed so as to hold rim 51 on its seat until a given pressure head is reached between its opposite faces.

Chambers 72, 73 on either side of rim 51 are connected to ducts 74, 75 leading to the two actuator chambers. Consequently, the pressure in chambers 72, 73 is equal to the pressure in the associated actuator chamber.

Springs 76 hold valves 60, 61 against the sealing seat on sleeves 62, 63 when the engine is off and there is no pressure head $p_1$-$p_o$. During normal operation valves 60, 61 are held in position by pressure $p_1$ in chambers 65, 66.

The device operates as follows. At rest, i.e. with zero torque on the pinion, piston 50 is in its centre position and there is a clearance between rims 58, 59 and valves 60, 61. The two actuator chambers, via duct 74, 75, chambers 72, 73 and the passages of the piston 50 and valve 61, are connected to duct 67 and thence to the supply at pressure $p_o$, and are therefore at pressure $p_o$. If an increasing torque is applied to the pinion, e.g. clockwise, the pinion moves and push-rod 48 is moved even further, e.g. towards the right, thus driving piston 50. The motion at each value of the torque depends on the recall action exerted by the system comprising the rubber rings, push-rod and rocker. At a certain value of the torque, the annular rim 59 presses against the sealing surface of valve 61 and tends to detach it from the seat on bush 63, against which it is pressed by pressure $p_1$ and spring 76. The valve does not come away until the thrust exerted by the piston is equal to the resultant of the pressures and the force of the spring. Consequently, as long as the torque on the pinion is below the value for producing the aforementioned thrust on the push-rod, the pressure in the actuator chambers will remain equal to $p_o$ and the servo-control means will not operate. Above this value the aperture between chambers 66 and 73 opens and fluid flows through and increases the pressure in 73 and in the corresponding chamber of the actuator. The pressure in 73 acts (a) on the piston, on the surface between effective sealing diameter of rim 59 and the outer diameter of rim 51 and (b) on the valve 61, on the area between rim 59 and the abutment against bush 63. The pressure of fluid against the piston tends to move it backwards and close the passage between chambers 66, 73 until the pressure p in 73 is the pressure at which the piston and valve 61 are at equilibrium under the action of the forces to which they are subjected. More specifically the piston must be in equilibrium under the action of the following: pressure p in chamber 73, pressure $p_o$ on the surfaces outside 73, stress Q transmitted by reaction from valve 61 and the stress exterted on the piston by the stem of push-rod 48. The valve must be in equilibrium under the action of the following: pressure $p_1$ in chamber 66, pressure p in 73, pressure $p_o$ on the rest of its surface, the force of spring 76 and load Q transmitted by the piston at rim 59.

As can easily be shown, the working pressure p, and consequently the force transmitted by the actuator to the rack, are linear functions of the torque on the pinion.

If, when the torque increases, pressure p or, more precisely, pressure head p-$p_o$ reaches a value at which the thrust at rim 51 exceeds the pre-stress of spring 52, the rim moves relative to the piston and relative to bush 56 (to the left in the case under consideration) until it rests against the edges of bush 62. During this time pressure p has further slightly increased as a result of the increase in the load of spring 52, which is compressed by the motion of the rim.

After the rim has stopped against bush 62, every further increase in pressure p acting on rim 51 goes directly on bush 62 and a slight increase in the load on the piston exerted by the stem of push-rod 48 is sufficient to produce a rapid increase in pressure p up to the value of $p_1$. Under these conditions, in fact, since the surface of the piston exposed to pressure p is very small, large increases in pressure p are necessary in response to even small increases in the thrust of the push-rod.

The curve of variation of pressure p versus torque is the same of that shown in FIG. 2, and its parameters, as for the valves of FIGS. 1 and 3, can easily be fixed and optimized depending on the application, by varying the angle of the teeth, the geometry of the system comprising rubber rings, push-rods and rocker, the diameters of valves, sealing seats on bush 63, front rim 59, the outer diameter of rim 51 and the characteristics of the springs.

Of course, if the direction of torque is reversed, operation is repeated in the opposite direction, with pressure p in chamber 72 instead of 73.

FIG. 5 shows in a larger scale a cross-section of piston, 50, showing an embodiment of the passages for oil around the stem of push-rod 48. Rod 48 can be secured to the piston after the piston has been broached.

FIG. 6 shows a structural variant of the solution of FIG. 4 in which the valve is sealed between pressure $p_1$ and pressure $p_o$ or p between the outer edges of the flanges of valves 77, 78 and the edges of grooves 79, 80 supplying fluid at pressure $p_1$, instead of using a front abutment as in FIG. 4. The feature of FIG. 6 results in some structural simplification and, more important, it can greatly reduce the amount of valve surface exposed to pressure $p_1$. When this surface is excessive, the result will be an excessive value of the torque, indicated at $c_i$ in the diagram of FIG. 2, at which the actuator begins to operate.

FIG. 7 shows a limiting case of the preceding solution, in which the aforementioned area is zero.

In FIGS. 6, 7 the cylindrical springs of FIG. 4 have been replaced by cup springs $81_a$, $82_a$, and 81, 82, but this is of course by way of example only and does not modify the operation of the device.

Moreover, in the same figures stop rings 83, 84 and $83_a$, $84_a$ hold valves 77, 78 and $77_a$, $78_a$ under the load of springs 85, 86 and $85_a$, $86_a$ in the position where the passage is closed of fluid $p_1$ from grooves 79, 80 and $79_a$, $80_a$.

FIG. 8 shows a valve which operates in the same manner of that of FIG. 4 and is particularly suitable for vacuum-operated power-steering devices or devices using heads $p_1 - p_o$ of the order of one bar. Rubber ring 87 is pressed by spring 88 acting on the piston bearing and by spring 89 of the valve, via piston 90 and push-rod 91. Sleeve 92 adjusts the load of spring 89 in such a way as to contrast the action of spring 88 and mantain the piston in its centre position with zero torque.

The outer rim of piston 90 is made up of two metal plates 93, 94 and a diaphragm 95 riveted between them.

The diaphragm is stretched between these two plates and sealed at the exterior at the junction between the two half-boxes 96, 97. Valves 60, 61 of FIG. 4 have been replaced by two rubber bellows 98, 99 secured to the same half-boxes at one end and bearing a flange at the other end, incorporating rigid members 100. The two flanges form a front seal against the annular rims 101, 102 of piston 90 and against rims 103, 104 born by the half-boxes 96, 97.

In a manner similar to that shown in FIG. 4, higher pressure $p_1$, the atmospheric pressure in this case, acts externally on the two bellows and is supplied by a pipe system 105, via a filter 106. The lower pressure $p_o$ (the negative pressure produced by a vacuum pump in this case) is supplied at the center of the valve and comes from a pipe system 107.

In its center position the piston is detached from the flanges of the two bellows, which however are pressed against the sealing rims 103, 104 by the same pressure $p_1$ and by two springs 108, 109. Thus the valve chambers 110, 111 and the two actuator chambers connected thereto by ducts 112, $112_a$ (the latter non indicated in the figure) are at negative pressure, by being connected to the vacuum reservoir by duct 107.

Operation is identical with that described for FIG. 4. At zero torque the chambers are connected to the vacuum source via: chambers 110, 111, the passages between the bellows flanges and rims 101, 102 and duct 107. When the piston is moved, e.g. to the left, the gap is closed between the flange of the left valve and rim 101 and the passage tends to open between the same flange and the annular rim 103, thus increasing the pressure p in chamber 110 and the corresponding chamber of the actuator. When the pressure head $p-p_o$ between chamber 110 and 111 is such that the thrust on plates 93, 94 and on diaphragm 95 exceeds the pre-stress of springs 113, the plates move relative to the piston until they abut ribs 114 on the box, whereupon the pressure rapidly rises to the maximum, i.e. to the atmospheric pressure. The graph of pressures in dependence on torque is the same as in FIG. 2.

Obviously the valves of FIGS. 1, 3, 8 can be controlled by a kinematic mechanism of the kind of FIGS. 4, 6, 7 and, conversely, these can have the mechanism of the former.

It must be noted the importance of the high ratio of the transmission mechanism between pinion and valve; it reduces the forces acting on piston and valve body and permits to reduce the dimensions of the entire valve.

In the particular case of a vacuum-operated power-steering unit, in view of the diameter required for the actuator, there may be difficulties in installing it in the engine cavity. In such case it may be advantageous to connect the actuator to the rack by suitable transmission members with a suitable ratio, thus making use of empty space not ajacent the steering gear. In addition variation can be made in the ratio of the diameter to the stroke of the actuator without altering the power-steering effect. FIG. 9 diagrammatically indicates a system of this kind with a power transmission lever.

Of course the illustrated solutions are by way of example only, without limitative force and the invention can be varied and adapted in various ways for increasing the efficiency and reducing the cost of the device, without thereby departing from the scope of the invention.

I claim:

1. A power-assisted rack-and-pinion steering mechanism for motorvehicles of the kind comprising:
   A rack,
   A helical-tooth pinion,
   A two-chambers actuator assisting the rack in its axial displacement,
   A valve which, depending on the torque applied to the pinion, adjusts the pressure head between the two chambers of the actuator,
   A reservoir of fluid, and
   A pump driven by the vehicle engine and producing the pressure head in the actuator chambers, the valve being of the slide-valve kind, with the slide member moving in translation along a stationary axis different from that of the pinion, to which pinion it is connected by means of a mechanism with a high transmission ratio, the slide member of the valve comprising a piston provided with a rim on each end face, each rim cooperating with an associated seat formed on the valve housing or on members born by the housing, said rim and seats forming passages through which the two actuator chambers are connected to the source of low pressure fluid, said passages varying as a result of the piston axial displacements, means being provided through which also the communication between the same chambers and the source of the higher pressure fluid is varied depending on the piston displacements, piston and seats being so designed that the fluid pressure in the operative chamber acts upon the surface of the piston included between its outer diameter and the effective diameter of sealing between rim and associated seat, and thus gives on the piston a thrust which is a linear function of the force transmitted by the pinion to the piston through the transmission mechanism, with the result that the pressure in the actuator operative chamber is a linear function of the torque applied by the driver to the steering-wheel.

2. A power-assisted rack-and-pinion steering mechanism as in claim 1, wherein the system is of the open centre kind, the valve piston being provided with grooves on its outer cylindrical surface cooperating with stationary grooves formed on the valve housing, the piston and the housing being designed in such a way that, in the centre position of the piston, the pump is in communication both with the two actuator chambers and with the reservoir and no pressure head exists between the two chambers, and when the piston moves from its centre position, in the first stroke length, via the cooperating grooves, the communication between the inoperative chamber and the pump is cut off, the other connections remaining open, and in the further piston stroke the passage between the piston rim and the cooperating seat on the housing, associated with the operative chamber, is thottled so that the pressure in said chamber increases whereas the pressure in the inoperative chamber is at its minimum level.

3. A power-assisted rack-and-pinion steering mechanism as in claim 2, wherein two annular members are added, lodged on each side of the piston in cavities formed in the same piston or in the valve housing or in parts fixed to the housing, these annular members cooperating with sealing seats born by the elements opposite to those bearing the cavities for the annular members, in such a way that each annular member and the cooperating sealing seat form a varying passage from the associated actuator chamber to the reservoir, analogous to the passage between piston rim and stationary seat on the housing, and inside said rim, said annular member being held by a pre-stressed spring against an abutment, secured to the part bearing said member, in such a position that when the piston moves from its centre position, after closing the communication of the inoperative chamber with the pump, the passage between said annular member and the cooperating seat is firstly throttled before significantly throttling tha analogous passage between the piston rim and the seat on housing, with the result that pressure in the operative chamber increases at a relative low rate, the area of the piston exposed to the pressure being relatively large, i.e. the area included between the outer diameter of the piston and the effective diameter of sealing between the annular member and its cooperating seat, this condition being satisfied as long as the pressure is below the value whereby the resulting force on the annular member overcomes the pre-stress of its spring whereas, when the pressure exceeds this value, the annular member re-enters its cavity and the rim of the piston comes into contact with the cooperating stationary seat throttling the flow of fluid in such a way that the pressure increases very rapidly versus the torque applied to the pinion, the area of the piston exposed to pressure being limited, i.e. the area included between the outer diameter of the piston and the effective diameter of sealing between the piston rim and its cooperating stationary seat.

4. A power-assisted rack-and-pinion steering mechanism as in claim 1, wherein the power-steering mechanism is of the closed centre kind, with two sources of fluid at different pressure $p_1$ and $p_o$, being $p_1$ higher than $p_o$, two annular valves being provided, coaxial with the piston and facing the front sealing rims of the piston, each annular valve being so designed as to form with the housing a seal which permanently separates the fluids at pressure $p_1$ and $p_o$ and to contact one of the actuator chambers to one or the other source of fluid via two passages, one of which is formed between the valve and the front sealing rim of the piston and is closed when this rim abuts the valve, whereas the other is formed between the valve and a sealing seat secured to the casing member and is open when the piston moves the annular valve pressing it through the front sealing rim so as to detach it from the sealing seat secured to the casing member, all the aforementioned sealing seats bounding regions on the piston and on the valves which are acted upon by pressures $p_1$ and $p_o$ and the instantaneous operating pressure p in the operative chamber of the actuator, so that at each instant said pressure p is bound by a linear law to the torque applied to the pinion, its resulting value being such that the piston and the annular valves are constantly in equilibrium under the action of the forces which they transmit one against the other at the front rim in contact, under the action of pressures $p_1$, $p_o$ and pressure p, acting on the aforementioned regions, and in addition the piston being acted upon by the thrust transmitted by the kinematic mechanism connecting it to the pinion, and the annular valve being exposed to the reaction of the front sealing seat secured to the casing member, against which it is pressed by the pressure $p_1$, in the embodiments in which such a seal of frontal kind exists.

5. A power-assisted rack-and-pinion steering mechanism as in claim 4, wherein the valve piston has an outer rim which can move relative to the central core bearing the two sealing rims acting on the annular valves, the outer piston rim being held in its centre position relative to the core by two pre-stressed springs whose pre-stress is exerted on appropriate abutments born by the core, the pre-stress being such as to prevent the rim moving relative to the core until the pressure head between the two faces of the piston reaches a set value, other abutments being provided on the casing member so as to stop the rim after it has moved a limited extent and absorb subsequent increases in the stress on the rim resulting from subsequent increases in the pressure head, the device being designed to ensure that, once the torque has reached a set value at which the pressure head in the actuator chambers and between the piston faces has become such as to give a thrust on the piston rim equal to the pre-stress of the aforementioned springs, the head increases rapidly to its maximum value, given by $p_1 - p_o$, with very small increases in the applied torque.

6. A power-assisted rack-and-pinion steering mechanism as in claim 5, wherein the fluid used is air, which is either compressed from the atmospheric pressure, which in this case is $p_o$, to a high pressure $p_1$, or is expanded by a vacuum pump and then used in the pressure head between atmospheric pressure, which in this case is $p_1$, and pressure $p_o$ supplied by the vacuum pump.

7. A power-assisted rack-and-pinion steering-mechanism as in claim 6, wherein the annular valves consist of resilient bellows provided at one end with a flange forming a front seal against the rim born by each face of the piston and against a second, stationary rim secured to the casing, the other end of the bellows being secured to the casing so as to form a seal between the fluids at pressure $p_1$ and $p_o$, the piston having a central core which bears the front sealing rims and a perimetral rim which moves relative to the core and is adapted to limit the torque as in claim 5, the construction being embodied by means of a diaphragm of resilient material stretched between the casing on the outside and a rigid central part which can move relative to the core and is centred thereon.

8. A power-assisted rack-and-pinion steering mechanism as in claim 7, wherein the actuator is connected to the rack by a mechanical transmission member so as to facilitate the installation thereof in the vehicle engine cavity and to vary the ratio between its travel and that of the rack.

9. A power-assisted rack-and-pinion steering mechanism as in claim 8, wherein the valve housing is separated from the steering gear housing and is secured to it by suitable means, the valve being designed in such a way that there is no radial constraint between sensor means and slide member of the valve, thus no centering means being necessary between said two housings for preventing the slide to force against its housing.

* * * * *